(12) United States Patent
Sikora et al.

(10) Patent No.: US 12,117,196 B2
(45) Date of Patent: Oct. 15, 2024

(54) ASSET BEHAVIOR MODELING

(71) Applicant: Honeywell International Inc., Charlotte, NC (US)

(72) Inventors: Marek Sikora, Prague (CZ); Jiri Rojicek, Prague (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 280 days.

(21) Appl. No.: 17/669,527

(22) Filed: Feb. 11, 2022

(65) Prior Publication Data

US 2022/0260271 A1    Aug. 18, 2022

Related U.S. Application Data

(60) Provisional application No. 63/148,980, filed on Feb. 12, 2021.

(51) Int. Cl.
| | |
|---|---|
| *F24F 11/63* | (2018.01) |
| *F24F 11/46* | (2018.01) |
| *F24F 11/49* | (2018.01) |
| *F24F 110/10* | (2018.01) |
| *F24F 110/20* | (2018.01) |

(52) U.S. Cl.
CPC .............. *F24F 11/63* (2018.01); *F24F 11/46* (2018.01); *F24F 11/49* (2018.01); *F24F 2110/10* (2018.01); *F24F 2110/20* (2018.01)

(58) Field of Classification Search
CPC .. F24F 11/63; F24F 11/46; F24F 11/49; F24F 2110/10; F24F 2110/20; F24F 11/006; F24F 11/30; G05B 23/0294; G05B 23/0283; G05B 15/02
See application file for complete search history.

(56) References Cited

U.S. PATENT DOCUMENTS

| | | | |
|---|---|---|---|
| 10,643,751 B1* | 5/2020 | Drouin | G16H 50/70 |
| 2012/0173299 A1 | 7/2012 | McMullin | |
| 2016/0146118 A1* | 5/2016 | Wichmann | F01D 21/003 |
| | | | 701/100 |
| 2017/0132938 A1* | 5/2017 | Lax | G08G 5/0095 |
| 2017/0315523 A1* | 11/2017 | Cross | G05B 13/048 |
| 2019/0087071 A1* | 3/2019 | Hournbuckle, Jr. | G06T 11/206 |
| 2019/0087990 A1* | 3/2019 | Hournbuckle, Jr. | |
| | | | G06F 3/04817 |
| 2020/0225655 A1* | 7/2020 | Cella | G05B 19/41875 |

(Continued)

OTHER PUBLICATIONS

ISA/220—Notification of Transmittal or Search Report and Written Opinion of the ISA, or the Declaration Mailed on Jun. 1, 2022 for WO Application No. PCT/US22/070634.

(Continued)

*Primary Examiner* — Alicia M. Choi
(74) *Attorney, Agent, or Firm* — Alston & Bird LLP

(57) ABSTRACT

Various embodiments described herein relate to providing asset behavior modeling. In this regard, a request to obtain one or more asset insights with respect to an asset is received. In response to the request, a model is executed based on sensor data associated with the asset and asset scenario data associated with different operation scenarios for the asset. The model represents predicted asset behavior of the asset to provide the one or more asset insights. Furthermore, in response to the request, one or more actions are performed based on the one or more asset insights.

22 Claims, 9 Drawing Sheets

(56) References Cited

U.S. PATENT DOCUMENTS

2020/0301408 A1\*   9/2020  Elbsat ..................... G06N 3/04
2020/0326684 A1   10/2020  Chand et al.
2020/0363794 A1\*  11/2020  Schuster ................ G06N 5/04
2021/0080941 A1\*   3/2021  Entzminger ..... G05B 19/41855
2021/0325072 A1\*  10/2021  Lin ......................... F24F 11/47

OTHER PUBLICATIONS

IPEA/409—International Preliminary Report on Patentability Mailed on Aug. 24, 2023 for WO Application No. PCT/US22/070634, 10 page(s).

\* cited by examiner

ASSET BEHAVIOR MODELING

CROSS REFERENCE TO RELATED APPLICATIONS

This application claims the benefit of U.S. Provisional Patent Application No. 63/148,980, titled "ASSET BEHAVIOR MODELING," and filed on Feb. 12, 2021, the entirety of which is hereby incorporated by reference.

TECHNICAL FIELD

The present disclosure relates generally to modeling asset behavior, and more particularly to modeling asset behavior using sensor data for assets.

BACKGROUND

Asset settings for an asset are generally configured by a user based on user knowledge or written instructions. For example, fan control settings for an air handler unit are generally configured by a user based on user knowledge or written instructions with respect to the air handler unit. However, asset settings configured based on user knowledge or written instructions with respect to an asset generally results in inefficiencies and/or decreased performance for the asset.

SUMMARY

The details of some embodiments of the subject matter described in this specification are set forth in the accompanying drawings and the description below. Other features, aspects, and advantages of the subject matter will become apparent from the description, the drawings, and the claims.

In an embodiment, a system comprises one or more processors, a memory, and one or more programs stored in the memory. The one or more programs comprise instructions configured to receive a request to obtain one or more asset insights with respect to an asset. The request comprises an asset identifier indicating an identity of the asset. In response to the request, a model representing predicted asset behavior of the asset to provide the one or more asset insights is executed based on sensor data associated with the asset and asset scenario data associated with different operation scenarios for the asset. Additionally, one or more actions are performed based on the one or more asset insights.

In another embodiment, a method comprises, at a device with one or more processors and a memory, receiving a request to obtain one or more asset insights with respect to an asset. The request comprises an asset identifier indicating an identity of the asset. In response to the request, the method comprises executing, based on sensor data associated with the asset and asset scenario data associated with different operation scenarios for the asset, a model representing predicted asset behavior of the asset to provide the one or more asset insights. Additionally, in response to the request, the method comprises performing one or more actions based on the one or more asset insights.

In yet another embodiment, a non-transitory computer-readable storage medium comprises one or more programs for execution by one or more processors of a device. The one or more programs include instructions which, when executed by the one or more processors, cause the device to receive a request to obtain one or more asset insights with respect to an asset. The request comprises an asset identifier indicating an identity of the asset. In response to the request, the one or more programs include instructions which, when executed by the one or more processors, cause the device to execute, based on sensor data associated with the asset and asset scenario data associated with different operation scenarios for the asset, a model representing predicted asset behavior of the asset to provide the one or more asset insights. Additionally, in response to the request, the one or more programs include instructions which, when executed by the one or more processors, cause the device to perform one or more actions based on the one or more asset insights.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
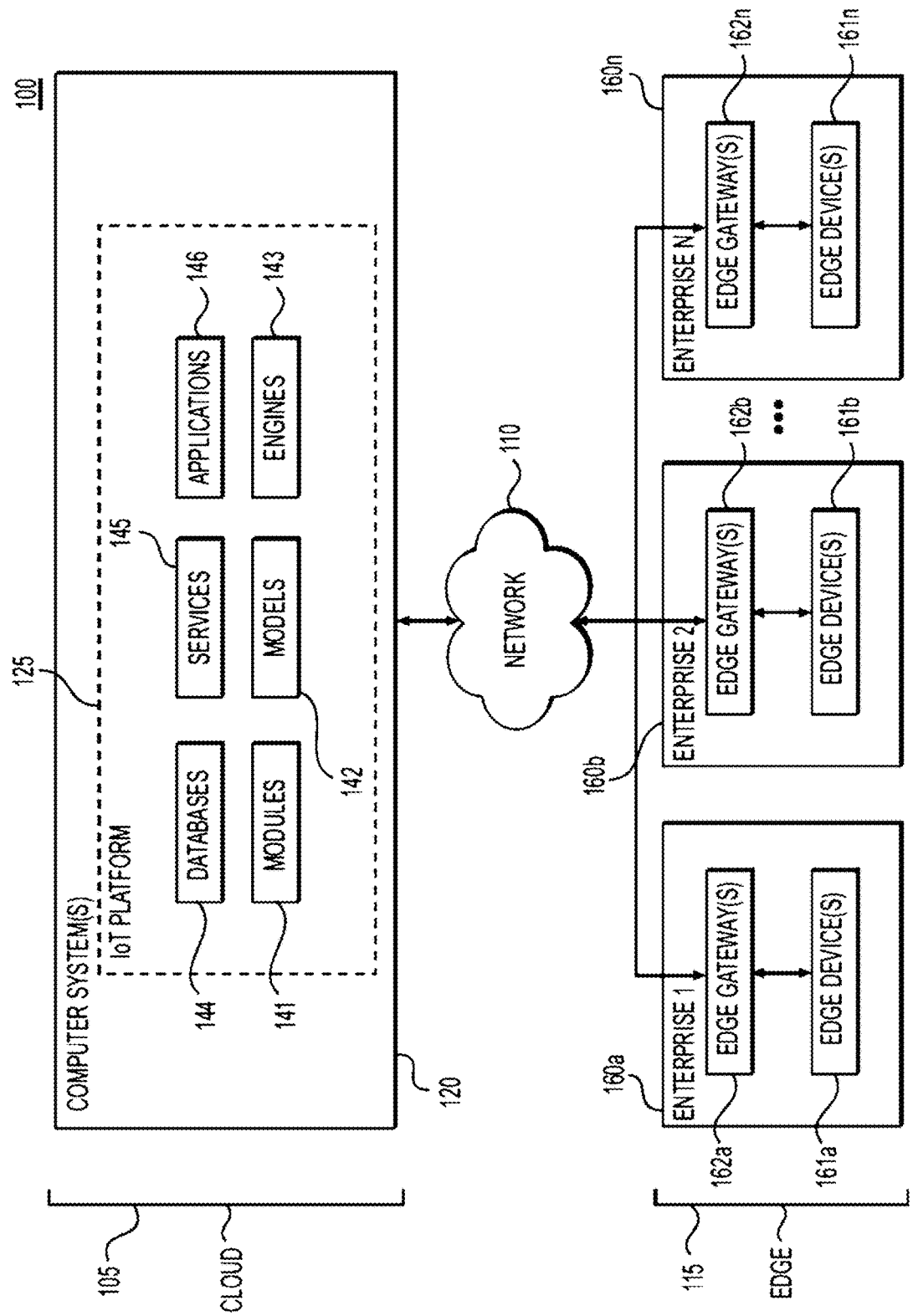
FIG. 1 illustrates an exemplary networked computing system environment, in accordance with one or more embodiments described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example,"

and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

In general, the present disclosure provides for an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, assets, people, and safety. Further, the IoT platform of the present disclosure supports end-to-end capability to execute digital twins against process data and to translate the output into actionable insights, as detailed in the following description.

Asset settings for an asset are generally configured by a user based on user knowledge or written instructions. For example, fan control settings for an air handler unit are generally configured by a user based on user knowledge or written instructions with respect to the air handler unit. However, asset settings configured based on user knowledge or written instructions with respect to an asset generally results in inefficiencies and/or decreased performance for the asset.

Certain assets have a predefined setting to satisfy certain operational criteria. For example, certain air handler unit have a minimal fan speed setting to satisfy a desired level of ventilation. As such, with a fan speed command for the air handler unit that is below a certain threshold, fan speed for a fan of the air handler unit is not lowered to maintain minimal air flow. Minimal air exchange is often required by regulation, but minimal fan speed setting is often misconfigured or misused. As such, a minimal fan speed setting is often set too high, resulting in increased energy consumption for the air handler unit.

Generally, a technician for the air handler unit analyzes data associated with the air handler unit to understand and/or evaluate possible energy savings of resetting minimal fan speed threshold or turning off a minimal fan speed threshold. However, it is generally difficult to determine a fan speed setting for the air handler unit that is optimal for air quality and efficiency for the air handler unit.

Thus, to address these and/or other issues, asset behavior modeling is provided to provide one or more asset insights with respect to one or more assets. Various embodiments described herein relate to analyzing collected sensor data for an asset using a model representing expected asset behavior to determine one or more insights for the asset. For example, in an exemplary embodiment, collected fan data for a fan of an air handler unit is analyzed using a model representing expected fan behavior to determine one or more fan settings (e.g., a minimal fan speed) for the air handler unit. In certain embodiments, fan behavior is modeled from observed fan speed commands and power demand for the fan. In certain embodiments, data from one or more sensors (e.g., one or more air quality sensors, one or more humidity sensors, one or more temperature sensors, one or more air flow sensors, etc.) is employed by the model to, for example, optimize minimal forced air flow while providing optimal building environmental conditions. In various embodiments, data from one or more sensors associated with an asset is ingested, cleaned and/or aggregated to provide sensor data for the asset. Furthermore, in various embodiments, one or more insights are determined from the sensor data to provide cost savings and/or efficiency insights for the asset. According to one or more embodiments, the model employs different operation scenarios for the asset to facilitate determining the one or more insights for the asset. In certain embodiments, an operation scenario for the asset includes one or more asset settings (e.g., a minimal fan speed setting) and cost savings criteria for the asset. In certain embodiments, at least a portion of data for an operation scenario is inferred from collected sensor data for the asset. Additionally or alternatively, in certain embodiments, at least a portion of data for an operation scenario is provided by a technician. As such, according to one or more embodiments, an asset is fine-tuned based on asset knowledge and/or modeled asset behavior to provide on or more insights related to one or more configurations of the asset.

In certain embodiments, an active minimal fan speed setting for an asset is analyzed to determine one or more inefficient settings for the asset. Furthermore, potential savings for the asset is evaluated based on an operational scenario for the asset where the one or more inefficient settings for the asset are modified (e.g., turned off). In certain embodiments, a minimal fan setting is verified based on analysis of air quality associated with the asset via one or more air quality sensors, one or more humidity sensors, one or more temperature sensors, one or more air flow sensors, and/or one or more other sensors. In an embodiment where a conditioned zone associated with the asset is greater than an air quality standard (e.g., air quality is good), an optimal setting for the asset is provided to provide one or more cost savings (e.g., one or more energy savings) for the asset. In another embodiment where a conditioned zone associated with the asset is less than an air quality standard (e.g., air quality is poor), an optimal setting for the asset to increase air quality is determined.

As such, by employing one or more techniques disclosed herein, asset performance and/or asset efficiency is optimized. Moreover, by employing one or more techniques disclosed herein, improved insights for an asset is provided to a user via improved visual indicators associated with a graphical user interface. For instance, by employing one or more techniques disclosed herein, additional and/or improved insights for an asset as compared to capabilities of conventional techniques is achieved. Additionally, performance of a processing system associated with data analytics is improved by employing one or more techniques disclosed herein. For example, a number of computing resources, a number of a storage requirements, and/or number of errors associated with providing insights for an asset is reduced by employing one or more techniques disclosed herein.

FIG. 1 illustrates an exemplary networked computing system environment 100, according to the present disclosure. As shown in FIG. 1, networked computing system environment 100 is organized into a plurality of layers including a cloud layer 105, a network layer 110, and an edge layer 115. As detailed further below, components of the edge 115 are in communication with components of the cloud 105 via network 110.

In various embodiments, network 110 is any suitable network or combination of networks and supports any appropriate protocol suitable for communication of data to and from components of the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprises any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 2 below. According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the result(s) to the users. According to various embodiments, computer systems 120 are part of an entity which include any type of company, organization, or institution that implements one or more IoT services. In some examples, the entity is an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or vehicle that includes any number of local devices.

Figure 2:
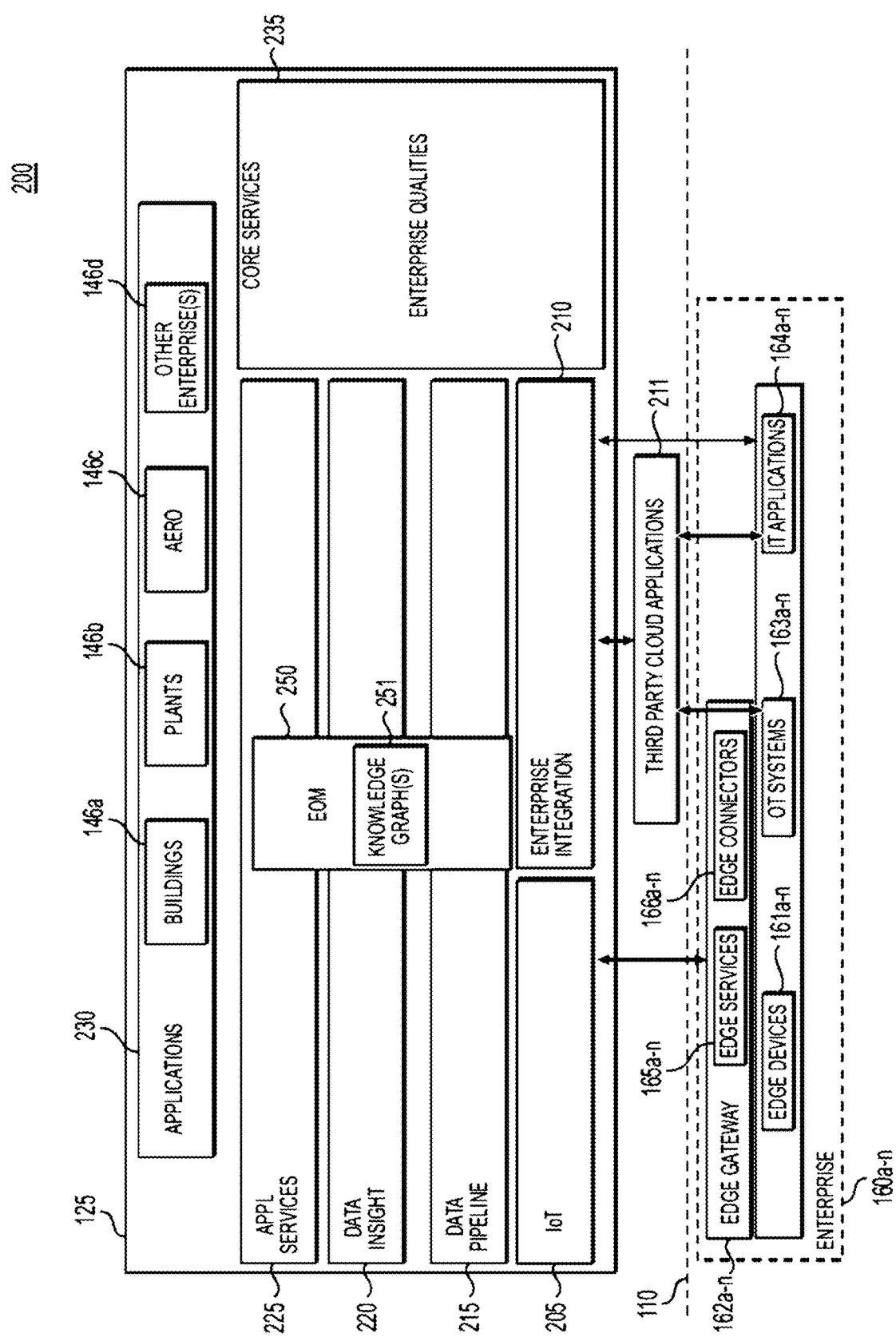
FIG. 2 illustrates a schematic block diagram of a framework of an IoT platform of the networked computing system, in accordance with one or more embodiments described herein.

According to various embodiments, the edge devices 161a-161n represent any of a variety of different types of devices that may be found within the enterprises 160a-160n. Edge devices 161a-161n are any type of device configured to access network 110, or be accessed by other devices through network 110, such as via an edge gateway 162a-162n. According to various embodiments, edge devices 161a-161n are "IoT devices" which include any type of network-connected (e.g., Internet-connected) device. For example, in one or more embodiments, the edge devices 161a-161n include sensors (e.g., one or more air quality sensors, one or more humidity sensors, one or more temperature sensors, one or more air flow sensor, and/or one or more other sensors), air handler units, fans, actuators, processors, computers, valves, pumps, ducts, vehicle components, cameras, displays, doors, windows, security components, HVAC components, factory equipment, and/or any other devices that are connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, in one or more embodiments, the edge 115 include operational technology (OT) systems 163a-163n and information technology (IT) applications 164a-164n of each enterprise 161a-161n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, WiFi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. With reference to FIG. 2, each edge gateway 162a-162n includes edge services 165a-165n and edge connectors 166a-166n. According to various embodiments, the edge services 165a-165n include hardware and software components for processing the data from the edge devices 161a-161n. According to various embodiments, the edge connectors 166a-166n include hardware and software components for facilitating communication between the edge gateway 162a-162n and the cloud 105 via network 110, as detailed above. In some cases, any of edge devices 161a-n, edge connectors 166a-n, and edge gateways 162a-n have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations for sustained peak performance of the enterprise 160a-160n. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, in one or more embodiments, each layer 205-235 includes one or more of the modules 141, models 142, engines 143, databases 144, services 145, applications 146, or combinations thereof. In some embodiments, the layers 205-235 are combined to form fewer layers. In some embodiments, some of the layers 205-235 are separated into separate, more numerous layers. In some embodiments, some of the layers 205-235 are removed while others may be added.

The IoT platform 125 is a model-driven architecture. Thus, in certain embodiments, the extensible object model 250 communicates with each layer 205-230 to contextualize site data of the enterprise 160a-160n using an extensible object model (or "asset model") and knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 include resource description framework (RDF) graphs. As used herein, a "RDF graph" is a graph data model that formally describes the semantics, or meaning, of information. The RDF graph also represents metadata (e.g., data that describes data). According to various embodiments, knowledge graphs 251 also include a semantic object model. The semantic object model is a subset of a knowledge graph 251 that defines semantics for the knowledge graph 251. For example, the semantic object model defines the schema for the knowledge graph 251.

As used herein, EOM 250 is a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161*a*-161*n* of an enterprise 160*a*-160*n*, and the knowledge graphs 251 are input into the EOM 250 for visualizing the models (e.g., the nodes and links).

The models describe the assets (e.g., the nodes) of an enterprise (e.g., the edge devices 161*a*-161*n*) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 161*a*-161*n*) and the type of data that is being sensed by each sensor. According to various embodiments, a key performance indicator (KPI) framework is used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161*a*-161*n* and the applications 146 that handle those devices 161*a*-161*n*. For example, when new edge devices 161*a*-161*n* are added to an enterprise 160*a*-160*n* system, the new devices 161*a*-161*n* will automatically appear in the IoT platform 125 so that the corresponding applications 146 understand and use the data from the new devices 161*a*-161*n*.

In some cases, asset templates are used to facilitate configuration of instances of edge devices 161*a*-161*n* in the model using common structures. An asset template defines the typical properties for the edge devices 161*a*-161*n* of a given enterprise 160*a*-160*n* for a certain type of device. For example, an asset template of a pump includes modeling the pump having inlet and outlet pressures, speed, flow, etc. The templates may also include hierarchical or derived types of edge devices 161*a*-161*n* to accommodate variations of a base type of device 161*a*-161*n*. For example, a reciprocating pump is a specialization of a base pump type and would include additional properties in the template. Instances of the edge device 161*a*-161*n* in the model are configured to match the actual, physical devices of the enterprise 160*a*-160*n* using the templates to define expected attributes of the device 161*a*-161*n*. Each attribute is configured either as a static value (e.g., capacity is 1000 BPH) or with a reference to a time series tag that provides the value. The knowledge graph 250 can automatically map the tag to the attribute based on naming conventions, parsing, and matching the tag and attribute descriptions and/or by comparing the behavior of the time series data with expected behavior.

In certain embodiments, the modeling phase includes an onboarding process for syncing the models between the edge 115 and the cloud 105. For example, in one or more embodiments, the onboarding process includes a simple onboarding process, a complex onboarding process, and/or a standardized rollout process. The simple onboarding process includes the knowledge graph 250 receiving raw model data from the edge 115 and running context discovery algorithms to generate the model. The context discovery algorithms read the context of the edge naming conventions of the edge devices 161*a*-161*n* and determine what the naming conventions refer to. For example, in one or more embodiments, the knowledge graph 250 receives "TMP" during the modeling phase and determine that "TMP" relates to "temperature." The generated models are then published. In certain embodiments, the complex onboarding process includes the knowledge graph 250 receiving the raw model data, receiving point history data, and receiving site survey data. According to various embodiments, the knowledge graph 250 then uses these inputs to run the context discovery algorithms. According to various embodiments, the generated models are edited and then the models are published. The standardized rollout process includes manually defining standard models in the cloud 105 and pushing the models to the edge 115.

The IoT layer 205 includes one or more components for device management, data ingest, and/or command/control of the edge devices 161*a*-161*n*. The components of the IoT layer 205 enable data to be ingested into, or otherwise received at, the IoT platform 125 from a variety of sources. For example, in one or more embodiments, data is ingested from the edge devices 161*a*-161*n* through process historians or laboratory information management systems. The IoT layer 205 is in communication with the edge connectors 165*a*-165*n* installed on the edge gateways 162*a*-162*n* through network 110, and the edge connectors 165*a*-165*n* send the data securely to the IoT platform 205. In some embodiments, only authorized data is sent to the IoT platform 125, and the IoT platform 125 only accepts data from authorized edge gateways 162*a*-162*n* and/or edge devices 161*a*-161*n*. According to various embodiments, data is sent from the edge gateways 162*a*-162*n* to the IoT platform 125 via direct streaming and/or via batch delivery. Further, after any network or system outage, data transfer will resume once communication is re-established and any data missed during the outage will be backfilled from the source system or from a cache of the IoT platform 125. According to various embodiments, the IoT layer 205 also includes components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163*a*-163*n* and IT applications 164*a*-164*n* of the enterprise 160*a*-160*n*. Thus, the enterprise integration layer 210 enables the IoT platform 125 to receive data from the third-party applications 211 rather than, or in combination with, receiving the data from the edge devices 161a-161n directly.

The data pipeline layer 215 includes one or more components for data cleansing/enriching, data transformation, data calculations/aggregations, and/or API for data streams. Accordingly, in one or more embodiments, the data pipeline layer 215 pre-processes and/or performs initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, in one or more embodiments, cleansed data is run through enterprise-specific digital twins. According to various embodiments, the enterprise-specific digital twins include a reliability advisor containing process models to determine the current operation and the fault models to trigger any early detection and determine an appropriate resolution. According to various embodiments, the digital twins also include an optimization advisor that integrates real-time economic data with real-time process data, selects the right feed for a process, and determines optimal process conditions and product yields.

According to various embodiments, the data pipeline layer 215 employs models and templates to define calculations and analytics. Additionally or alternatively, according to various embodiments, the data pipeline layer 215 employs models and templates to define how the calculations and analytics relate to the assets (e.g., the edge devices 161a-161n). For example, in an embodiment, a fan template defines fan efficiency calculations such that every time a fan is configured, the standard efficiency calculation is automatically executed for the fan. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 161a-161n) instance is created, any associated calculation instances are also created with their input and output parameters linked to the appropriate attributes of the asset (e.g., edge device 161a-161n).

According to various embodiments, the IoT platform 125 supports a variety of different analytics models including, for example, curve fitting models, regression analysis models, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, in one or more embodiments, the IoT platform 125 drill downs from a high-level condition to understand the contributing factors, as well as determining the potential impact a lower level condition may have. There may be multiple fault models for a given enterprise 160a-160n looking at different aspects such as process, equipment, control, and/or operations. According to various embodiments, each fault model identifies issues and opportunities in their domain, and can also look at the same core problem from a different perspective. According to various embodiments, an overall fault model is layered on top to synthesize the different perspectives from each fault model into an overall assessment of the situation and point to the true root cause.

According to various embodiments, when a fault or opportunity is identified, the IoT platform 125 provides recommendations about optimal corrective actions to take. Initially, the recommendations are based on expert knowledge that has been pre-programmed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics.

According to various embodiments, the models are used to accurately predict what will occur before it occurs and interpret the status of the installed base. Thus, the IoT platform 125 enables operators to quickly initiate maintenance measures when irregularities occur. According to various embodiments, the digital twin architecture of the IoT platform 125 employs a variety of modeling techniques. According to various embodiments, the modeling techniques include, for example, rigorous models, fault detection and diagnostics (FDD), descriptive models, predictive maintenance, prescriptive maintenance, process optimization, and/or any other modeling technique.

According to various embodiments, the rigorous models are converted from process design simulation. In this manner, in certain embodiments, process design is integrated with feed conditions. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various embodiments, the descriptive models identifies a problem and the predictive models determines possible damage levels and maintenance options. According to various embodiments, the descriptive models include models for defining the operating windows for the edge devices 161a-161n.

Predictive maintenance includes predictive analytics models developed based on rigorous models and statistic models, such as, for example, principal component analysis (PCA) and partial least square (PLS). According to various embodiments, machine learning methods are applied to train models for fault prediction. According to various embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. According to various embodiments, when raw data is received at the IoT platform 125, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 215 accesses the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services. The application services layer 225 enables building of applications 146a-d. The applications layer 230 includes one or more applications 146a-d of the IoT platform 125. For example, according to various embodiments, the applications 146a-d includes a buildings application 146a, a plants application 146b, an aero application 146c, and other enterprise applications 146d. According to various embodiments, the applications 146 includes general applications 146 for portfolio management, asset management, autonomous control, and/or any other custom applications. According to various embodiments, portfolio management includes the KPI framework and a flexible user interface (UI) builder. According to various embodiments, asset management includes asset performance, asset health, and/or asset predictive maintenance. According to various embodiments, autonomous control includes energy optimization and/or predictive maintenance. As detailed above, according to various embodiments, the general applications 146 is extensible such that each application 146 is configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. According to various embodiments, the core services 235 include data visualization, data analytics tools, security, scaling, and monitoring. According to various embodiments, the core services 235 also include services for tenant provisioning, single login/common portal, self-service admin, UI library/UI tiles, identity/access/entitlements, logging/monitoring, usage metering, API gateway/dev portal, and the IoT platform 125 streams.

Figure 3:
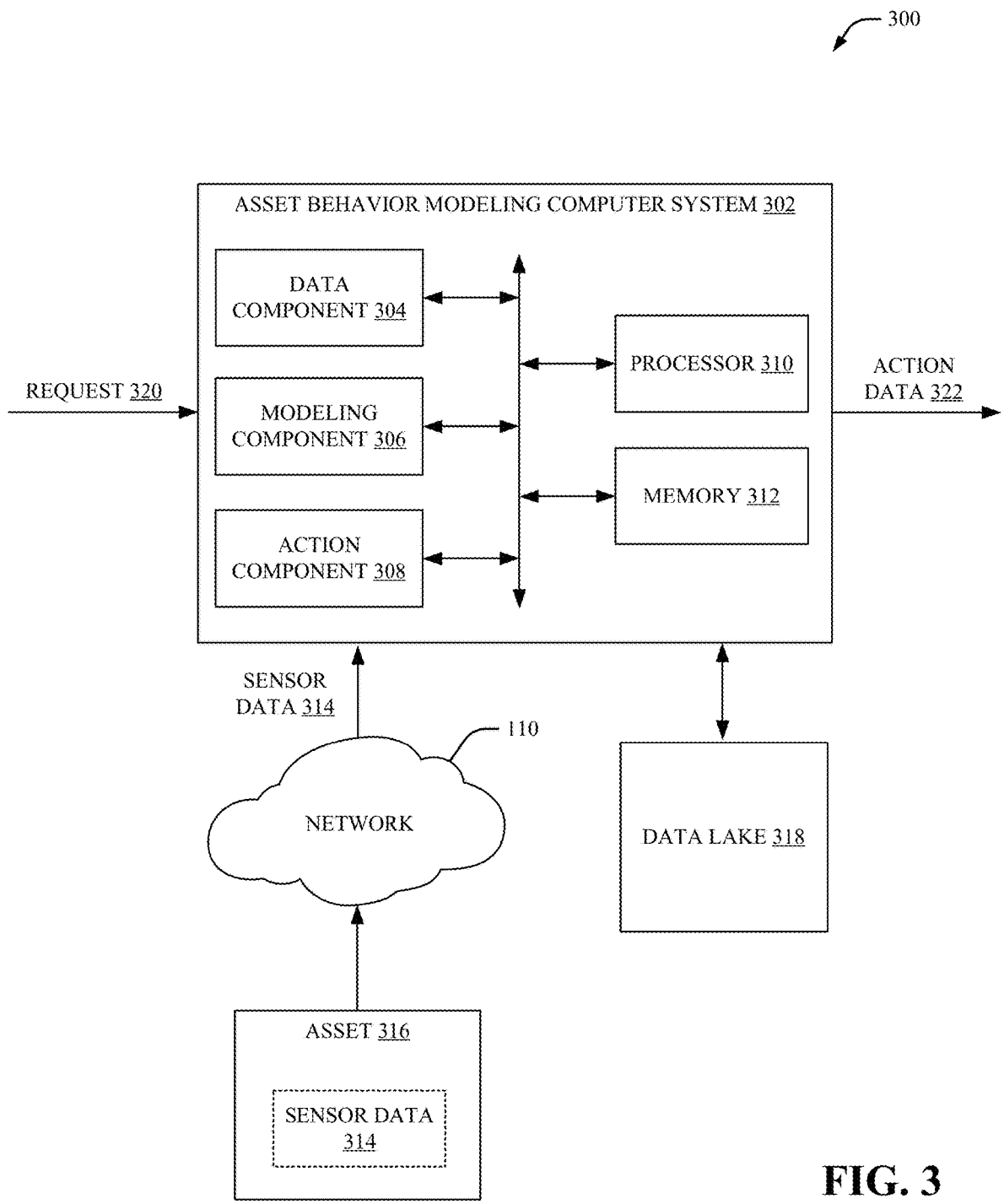
FIG. 3 illustrates a system that provides an exemplary environment, in accordance with one or more embodiments described herein.

FIG. 3 illustrates a system 300 that provides an exemplary environment according to one or more described features of one or more embodiments of the disclosure. According to an embodiment, the system 300 includes an asset behavior modeling computer system 302 to facilitate a practical application of data modeling technology, digital transformation technology, and/or predictive maintenance technology to provide optimization related to one or more assets in an enterprise environment (e.g., one or more assets in a building environment, etc.). In one or more embodiments, the asset behavior modeling computer system 302 facilitates a practical application of machine learning technology to provide optimization related to enterprise performance management. In one or more embodiments, the asset behavior modeling computer system 302 analyzes sensor data related to one or more assets that is ingested, cleaned and/or aggregated from one or more to provide cost saving insights and/or efficiency insights for the one or more assets.

In an embodiment, the asset behavior modeling computer system 302 is a server system (e.g., a server device) that facilitates a data analytics platform between one or more computing devices and one or more assets. In one or more embodiments, the asset behavior modeling computer system 302 is a device with one or more processors and a memory. In one or more embodiments, the asset behavior modeling computer system 302 is a computer system from the computer systems 120. For example, in one or more embodiments, the asset behavior modeling computer system 302 is implemented via the cloud 105. The asset behavior modeling computer system 302 is also related to one or more technologies, such as, for example, enterprise technologies, modeling technologies, predictive maintenance technologies, asset performance management technologies, connected building technologies, data analytics technologies, digital transformation technologies, cloud computing technologies, cloud database technologies, server technologies, network technologies, wireless communication technologies, machine learning technologies, artificial intelligence technologies, digital processing technologies, electronic device technologies, computer technologies, sensor technologies, Internet of Things (IoT) technologies, industrial technologies, supply chain analytics technologies, aircraft technologies, cybersecurity technologies, navigation technologies, asset visualization technologies, oil and gas technologies, petrochemical technologies, refinery technologies, process plant technologies, procurement technologies, and/or one or more other technologies.

Moreover, the asset behavior modeling computer system 302 provides an improvement to one or more technologies such as enterprise technologies, modeling technologies, predictive maintenance technologies, asset performance management technologies, connected building technologies, data analytics technologies, digital transformation technologies, cloud computing technologies, cloud database technologies, server technologies, network technologies, wireless communication technologies, machine learning technologies, artificial intelligence technologies, digital processing technologies, electronic device technologies, computer technologies, sensor technologies, Internet of Things (IoT) technologies, industrial technologies, supply chain analytics technologies, aircraft technologies, cybersecurity technologies, navigation technologies, asset visualization technologies, oil and gas technologies, petrochemical technologies, refinery technologies, process plant technologies, procurement technologies, and/or one or more other technologies. In an implementation, the asset behavior modeling computer system 302 improves performance of a computing device. For example, in one or more embodiments, the asset behavior modeling computer system 302 improves processing efficiency of a computing device (e.g., a server), reduces power consumption of a computing device (e.g., a server), improves quality of data provided by a computing device (e.g., a server), etc.

The asset behavior modeling computer system 302 includes a data component 304, a modeling component 306 and/or an action component 308. Additionally, in certain embodiments, the asset behavior modeling computer system 302 includes a processor 310 and/or a memory 312. In certain embodiments, one or more aspects of the asset behavior modeling computer system 302 (and/or other systems, apparatuses and/or processes disclosed herein) constitute executable instructions embodied within a computer-readable storage medium (e.g., the memory 312). For instance, in an embodiment, the memory 312 stores computer executable component and/or executable instructions (e.g., program instructions). Furthermore, the processor 310 facilitates execution of the computer executable components and/or the executable instructions (e.g., the program instructions). In an example embodiment, the processor 310 is configured to execute instructions stored in the memory 312 or otherwise accessible to the processor 310.

The processor 310 is a hardware entity (e.g., physically embodied in circuitry) capable of performing operations according to one or more embodiments of the disclosure. Alternatively, in an embodiment where the processor 310 is embodied as an executor of software instructions, the software instructions configure the processor 310 to perform one or more algorithms and/or operations described herein in response to the software instructions being executed. In an embodiment, the processor 310 is a single core processor, a multi-core processor, multiple processors internal to the asset behavior modeling computer system 302, a remote processor (e.g., a processor implemented on a server), and/or a virtual machine. In certain embodiments, the processor 310 is in communication with the memory 312, the data component 304, the modeling component 306 and/or the action component 308 via a bus to, for example, facilitate transmission of data among the processor 310, the memory 312, the data component 304, the modeling component 306 and/or the action component 308. The processor 310 may embodied in a number of different ways and can, in certain embodiments, includes one or more processing devices configured to perform independently. Additionally or alternatively, in one or more embodiments, the processor 310 includes one or more processors configured in tandem via a bus to enable independent execution of instructions, pipelining of data, and/or multi-thread execution of instructions.

The memory 312 is non-transitory and includes, for example, one or more volatile memories and/or one or more non-volatile memories. In other words, in one or more embodiments, the memory 312 is an electronic storage device (e.g., a computer-readable storage medium). The memory 312 is configured to store information, data, content, one or more applications, one or more instructions, or the like, to enable the asset behavior modeling computer system 302 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In an embodiment, the asset behavior modeling computer system 302 (e.g., the data component 304 of the asset behavior modeling computer system 302) receives sensor data 314. In one or more embodiments, the asset behavior modeling computer system 302 (e.g., the data component 304 of the asset behavior modeling computer system 302) receives the sensor data 314 from an asset 316. In certain embodiments, the asset 316 incorporates encryption capabilities to facilitate encryption of one or more portions of the sensor data 314. In one or more embodiments, the asset 316 is associated with components of the edge 115 such as, for example, one or more enterprises 160a-160n. In one or more embodiments, the asset 316 is an edge device from the one or more edge devices 161a-161n. In certain embodiments, the asset 316 is an air handler unit that includes a fan. However, it is to be appreciated that, in certain embodiments, the asset 316 is another type of asset. Additionally, in one or more embodiments, the asset behavior modeling computer system 302 (e.g., the data component 304 of the asset behavior modeling computer system 302) receives the sensor data 314 via the network 110. In one or more embodiments, the network 110 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network.

In one or more embodiments, the sensor data 314 is collected from one or more sensors coupled to the asset 316. For instance, in one or more embodiments, the sensor data 314 is collected from one or more sensors physically coupled to the asset 316. Additionally or alternatively, in one or more embodiments, the sensor data 314 is collected from one or more sensors communicatively coupled to the asset 316. In certain embodiments, the sensor data 314 is additionally or alternatively collected from one or more sensors included in a building environment associated with the asset 316. For example, in certain embodiments, the sensor data 314 is additionally or alternatively collected from one or more sensors included in a building structure, a building zone, a building room, a building floor, and/or another building environment that includes the asset 316. In one or more embodiments, one or more sensors associated with the sensor data 314 includes one or more air quality sensors (e.g., one or more carbon dioxide sensors), one or more humidity sensors, one or more temperature sensors, one or more air flow sensor, and/or one or more other sensors.

In one or more embodiments, the data component 304 aggregates the sensor data 314 from the one or more sensors associated with the asset 316. For instance, in one or more embodiments, the data component 304 can aggregate the sensor data 314 into a data lake 318. In one or more embodiments, the data lake 318 is a centralized repository (e.g., a single data lake) that stores unstructured data and/or structured data included in the sensor data 314. In one or more embodiments, the data component 304 repeatedly updates data of the data lake 318 at one or more predetermined intervals. For instance, in one or more embodiments, the data component 304 stores new sensor data and/or modified sensor data associated with the asset 316. In one or more embodiments, the data component 304 repeatedly monitors the one or more sensors associated with the asset 316 to determine the sensor data 314 for storage in the data lake 318.

In one or more embodiments, the asset behavior modeling computer system 302 (e.g., the modeling component 306 of the asset behavior modeling computer system 302) receives a request 320. In an embodiment, the request 320 is a request to obtain one or more insights with respect to the asset 316. For instance, in one or more embodiments, the request 320 is a request to obtain one or more insights with respect to the sensor data 314 associated with the asset 316. In one or more embodiments, the request 320 includes an asset identifier that indicates an identity of the asset 316. The asset identifier in the request 320 is a digital code such as, for example, a machine-readable code, a combination of numbers and/or letters, a string of bits, a barcode, a Quick Response (QR) code, an industrial asset tag number (e.g., an industrial equipment tag number), a digital label, a photo of the asset 316, or another type of identifier for the asset 316. Furthermore, the asset identifier in the request 320 facilitates identification of the asset 316. For instance, in an embodiment, the data component 304 employs the asset identifier to identify (e.g., uniquely identify) a type of asset for the asset 316, a description of the asset 316, a state of the asset 316, real-time settings for the asset 316, configuration information for the asset 316, maintenance history for the asset 316, environmental regulations for the asset 316, air quality regulation for an environment associated with the asset 316, one or more regulation settings related to the asset 316, a predefined list of settings for the asset 316, predefined duty cycle settings for the asset 316, information related to sensors associated with the asset 316, and/or other information associated with the asset 316.

In one or more embodiments, in response to the request 320, the modeling component 306 performs one or more modeling processes with respect to the sensor data 314 and/or asset scenario data associated with different operation scenarios for the asset 316. For instance, the modeling component 306 executes, based on the sensor data 314 and/or asset scenario data associated with different operation scenarios for the asset 316, a model representing predicted asset behavior of the asset 316 to provide one or more asset insights for the asset 316. In one or more embodiments, the asset scenario data includes different operation scenarios for the asset 316. The different operation scenarios include, for example, different asset settings for the asset 316 and/or different time schedules for the asset 316. For example, in an embodiment where the asset 316 is an air handler unit with a fan, the different operation scenarios include different fan data such as different observed fan speed commands and/or different power demands for one or more time schedules. In one or more embodiments, a time schedule is an interval of time for operation of the asset 316. In one or more embodiments, the asset scenario data includes a power consumption estimation for the asset 316. The power consumption estimation provides, for example, estimated power consumption for the asset 316 based on the different asset settings for the asset 316 and/or the different time schedules for the asset 316. In one or more embodiments, the modeling component 306 obtains the sensor data 314 based on the asset identifier in the request 320. For example, in an embodiment, the modeling component 306 obtains at least a portion of the sensor data 314 from the data lake 318 based on the asset identifier in the request 320. Additionally or alternatively, in an embodiment, the modeling component 306 obtains at least a portion of the sensor data 314 directly from the asset 316 based on the asset identifier in the request 320

In one or more embodiments, the modeling component 306 performs a machine learning process with respect to the sensor data 314 to determine one or more insights associated with the sensor data 314. In an embodiment, the one or more modeling processes performed by the modeling component 306 employs regression analysis to determine one or more insights associated with the sensor data 314. For example, in an embodiment, the modeling component 306 executes the model based on a regression analysis modeling technique with respect to the sensor data 314 and the asset scenario data. In another embodiment, the one or more modeling processes performed by the modeling component 306 employs curve fitting to determine one or more insights associated with the sensor data 314. For example, in another embodiment, the modeling component 306 executes the model based on a curve fitting modeling technique with respect to the sensor data 314 and the asset scenario data. In certain embodiments, the modeling component 306 employs a clustering technique to determine one or more insights associated with the sensor data 314. In certain embodiments, the modeling component 306 determines the one or more insights based on relationships, correlations and/or predictions between aspects of the sensor data 314 and/or the asset scenario data using the regression analysis modeling technique, the curve fitting modeling technique, the clustering technique, and/or another type of modeling technique. However, it is to be appreciated that, in certain embodiments, the modeling component 306 employs a different type of modeling technique to determine one or more insights associated with the sensor data 314 and/or the asset 316. In one or more embodiments, the one or more insights include one or more asset insights, one or more cost saving insights, one or more predictive maintenance insights, and/or one or more other types of insights related to the asset 316. In one or more embodiments, the one or more insights include one or more optimal settings for the asset 316. For instance, in an embodiment, the one or more insights include an optimal fan speed setting for the asset 316. In another embodiment, the one or more insights include a minimum fan speed setting for the asset 316

The action component 308 performs one or more actions based on the one or more insights (e.g., the one or more asset insights, the one or more cost saving insights, the one or more predictive maintenance insights, and/or the one or more other types of insights related to the asset 316). In one or more embodiments, the action component 308 generates action data 322 associated with the one or more actions.

In an embodiment, an action from the one or more actions includes generating a user-interactive electronic interface that renders a visual representation of the one or more insights. For example, in an embodiment, an action from the one or more actions includes configuring a visualization (e.g., a dashboard visualization) of the one or more insights for display via an electronic interface of a computing device. In another embodiment, an action from the one or more actions includes transmitting, to a computing device, one or more notifications associated with the one or more insights. For example, in another embodiment, an action from the one or more actions includes generating and/or transmitting, based on the one or more insights, one or more notifications for display via an electronic interface of a computing device. In an exemplary embodiment, a notification advises that the asset 316 is operating inefficiently (e.g., wasting energy). In another exemplary embodiment, a notification indicates one or more optimal settings for the asset 316. In another exemplary embodiment, a notification advises how often a fan speed command (e.g., a fan speed command below a minimal fan speed setting for the asset 316) is overridden by the asset 316. In another exemplary embodiment, a notification includes information regarding an automated service for the asset 316 to provide, for example, possible savings greater than given setting value for the asset 316.

In another embodiment, an action from the one or more actions includes modifying one or more settings for the asset 316 based on the one or more insights. In another embodiment, an action from the one or more actions includes modifying one or more settings for the asset 316 based on control data (e.g., user remote control feedback data) for the asset 316 that is provided via an electronic interface of a computing device. In another embodiment, an action from the one or more actions includes generating one or more work orders for the asset 316 based on work order data for the asset 316 that is provided via an electronic interface of a computing device. In another embodiment, an action from the one or more actions includes determining, based on the one or more insights, likelihood of success for a given operation scenario associated with the asset 316. In another embodiment, an action from the one or more actions includes providing one or more optimal settings for the asset 316. In another embodiment, an action from the one or more actions includes providing an optimal process condition for the asset 316. For example, in another embodiment, an action from the one or more actions includes adjusting a set-point and/or a schedule for the asset 316. In another embodiment, an action from the one or more actions includes one or more predictive maintenance actions for the asset 316. In another embodiment, an action from the one or more actions includes providing an optimal maintenance option for the asset 316. In another embodiment, an action from the one or more actions includes retraining one or more portions of the model based on the one or more insights. For example, in certain embodiments, an action from the one or more actions includes modifying one or more values and/or one or more weights for the model. In another embodiment, an action from the one or more actions includes an action associated with the application services layer 225, the applications layer 230, and/or the core services layer 235.

In one or more embodiments, the action component 308 additionally employs a scoring model based on different metrics from historical iterations of process associated with asset 316, historical iterations associated with the model for the asset 316, and/or previous actions to determine the one or more actions. For example, in one or more embodiments, the scoring model employs weights for different metrics, different conditions, and/or different rules for the one or more actions. In one or more embodiments, the action component 308 additionally employs location data and/or building identifier data (e.g., geographic area exceptions to modify a recommendation and/or to remove false positive recommendations based on one or more regulations associated with a building). In another example, in one or more embodiments, the scoring model employs weights for different time schedules for the asset 316 (e.g., a first weight for a first interval of time associated with daytime operation of the asset 316, a second weight for a second interval of time associated with a nighttime operation of the asset 316, etc.).

Figure 4:
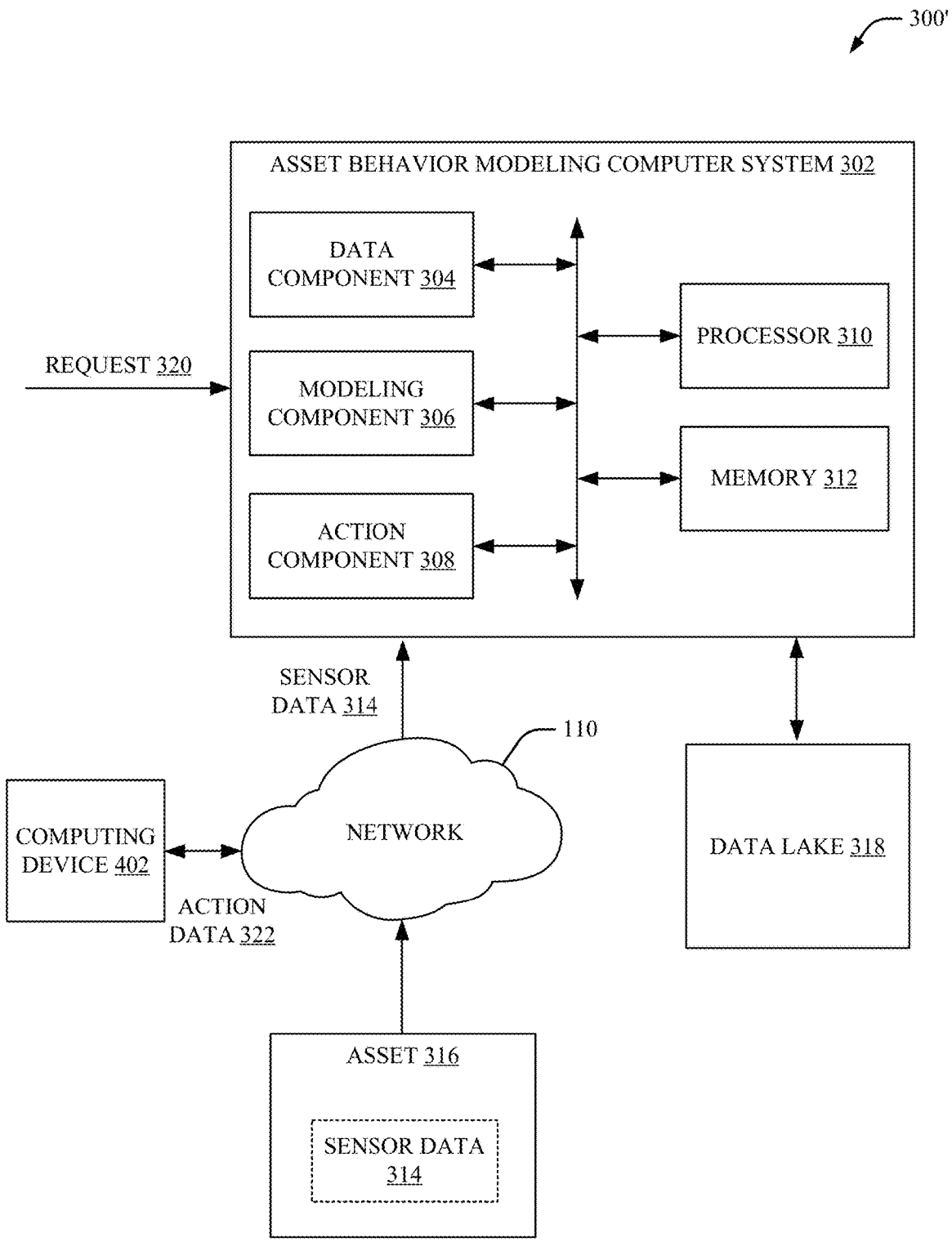
FIG. 4 illustrates another system that provides an exemplary environment, in accordance with one or more embodiments described herein.

FIG. 4 illustrates a system 300' that provides an exemplary environment according to one or more described features of one or more embodiments of the disclosure. In an embodiment, the system 300' corresponds to an alternate embodiment of the system 300 shown in FIG. 3. According to an embodiment, the system 300' includes the asset behavior modeling computer system 302, the asset 316, the data lake 318 and/or a computing device 402. In one or more embodiments, the asset behavior modeling computer system 302 is in communication with the asset 316 and/or the computing device 402 via the network 110. The computing device 402 is a mobile computing device, a smartphone, a tablet computer, a mobile computer, a desktop computer, a laptop computer, a workstation computer, a wearable device, a virtual reality device, an augmented reality device, or another type of computing device located remote from the asset behavior modeling computer system 302.

In one or more embodiments, the action component 308 communicates the action data 322 to the computing device 402. For example, in one or more embodiments, the action data 322 includes one or more visual elements for a visual display (e.g., a user-interactive electronic interface) of the computing device 402 that renders a visual representation of the one or more insights. In certain embodiments, the visual display of the computing device 402 displays one or more graphical elements associated with the action data 322 (e.g., the one or more insights). In certain embodiments, the visual display of the computing device 402 provides a graphical user interface to facilitate managing data use associated with the asset 316, costs associated with the asset 316, maintenance associated with the asset 316, asset planning associated with the asset 316, asset services associated with the asset 316, asset operations associated with the asset 316, and/or one or more other aspects of the asset 316. In certain embodiments, the visual display of the computing device 402 provides a graphical user interface to facilitate predicting an asset condition for one or more assets associated with the sensor data 314. In certain embodiments, the visual display of the computing device 402 provides a graphical user interface to facilitate visualization of the one or more insights via an electronic interface of the computing device 402. In another example, in one or more embodiments, the action data 322 includes one or more notifications associated with the one or more insights to facilitate display of the one or more notifications via the computing device 402. In one or more embodiments, the action data 322 allows a user associated with the computing device 402 to make decisions and/or perform one or more actions with respect to the one or more insights.

Figure 5:
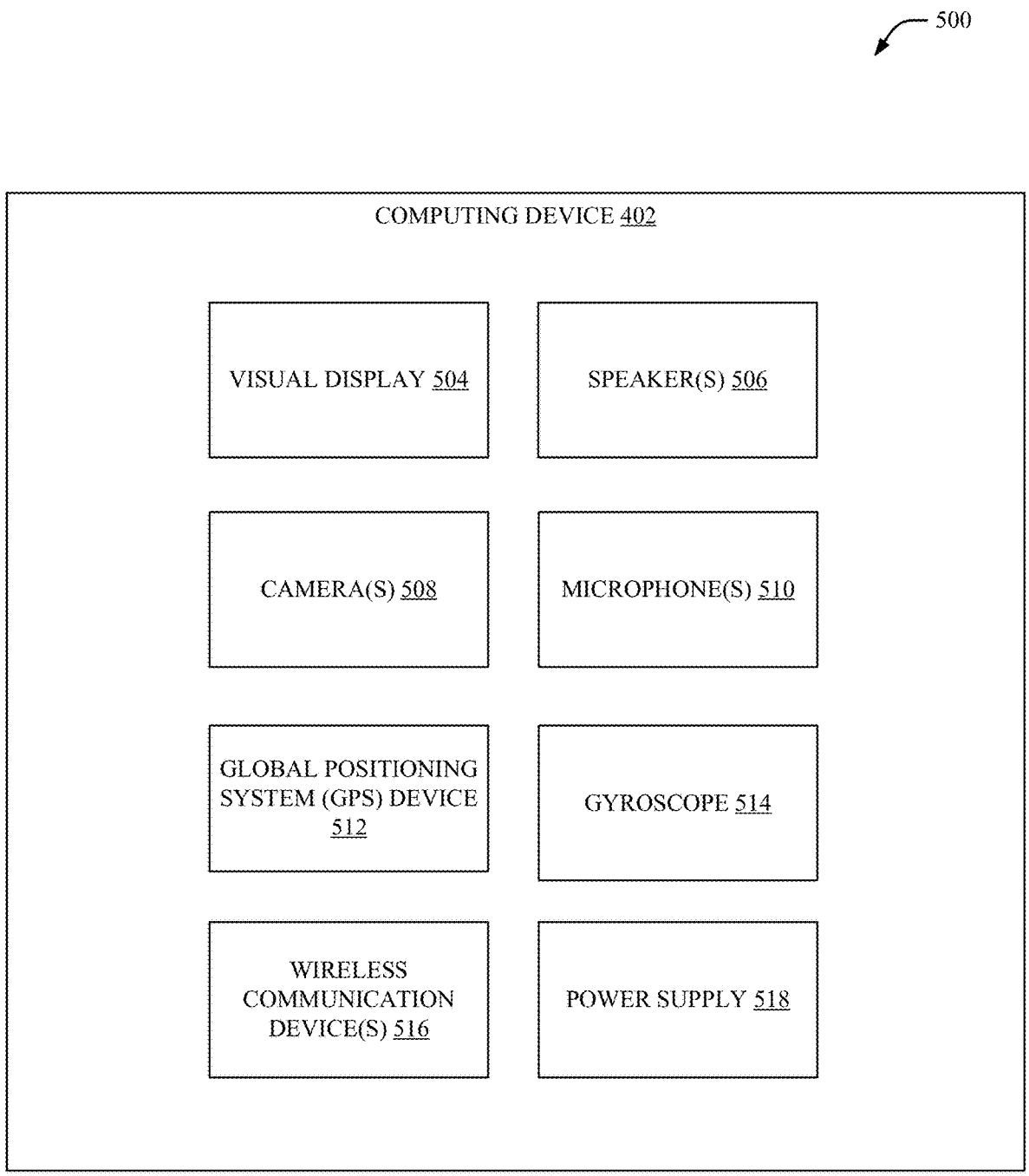
FIG. 5 illustrates an exemplary computing device, in accordance with one or more embodiments described herein.

FIG. 5 illustrates a system 500 according to one or more embodiments of the disclosure. The system 500 includes the computing device 402. In one or more embodiments, the computing device 402 employs mobile computing, augmented reality, cloud-based computing, IoT technology and/or one or more other technologies to provide video, audio, real-time data, graphical data, one or more communications one or more messages, one or more notifications, one or more documents, one or more work procedures, asset identifier details, and/or other media data associated with the one or more insights. The computing device 402 includes mechanical components, electrical components, hardware components and/or software components to facilitate obtaining one or more insights associated with the sensor data 314. In the embodiment shown in FIG. 5, the computing device 402 includes a visual display 504, one or more speakers 506, one or more cameras 508, one or more microphones 510, a global positioning system (GPS) device 512, a gyroscope 514, one or more wireless communication devices 516, and/or a power supply 518.

In an embodiment, the visual display 504 is a display that facilitates presentation and/or interaction with one or more portions of the action data 322. In one or more embodiments, the computing device 402 displays an electronic interface (e.g., a graphical user interface) associated with a predictive maintenance platform associated with the asset 316. In one or more embodiments, the visual display 504 is a visual display that renders one or more interactive media elements via a set of pixels. The one or more speakers 506 include one or more integrated speakers that project audio. The one or more cameras 508 include one or more cameras that employ autofocus and/or image stabilization for photo capture and/or real-time video. The one or more microphones 510 include one or more digital microphones that employ active noise cancellation to capture audio data. The GPS device 512 provides a geographic location for the computing device 402. The gyroscope 514 provides an orientation for the computing device 402. The one or more wireless communication devices 516 includes one or more hardware components to provide wireless communication via one or more wireless networking technologies and/or one or more short-wavelength wireless technologies. The power supply 518 is, for example, a power supply and/or a rechargeable battery that provides power to the visual display 504, the one or more speakers 506, the one or more cameras 508, the one or more microphones 510, the GPS device 512, the gyroscope 514, and/or the one or more wireless communication devices 516. In certain embodiments, the action data 322 associated with the one or more insights is presented via the visual display 504 and/or the one or more speakers 506.

Figure 6:
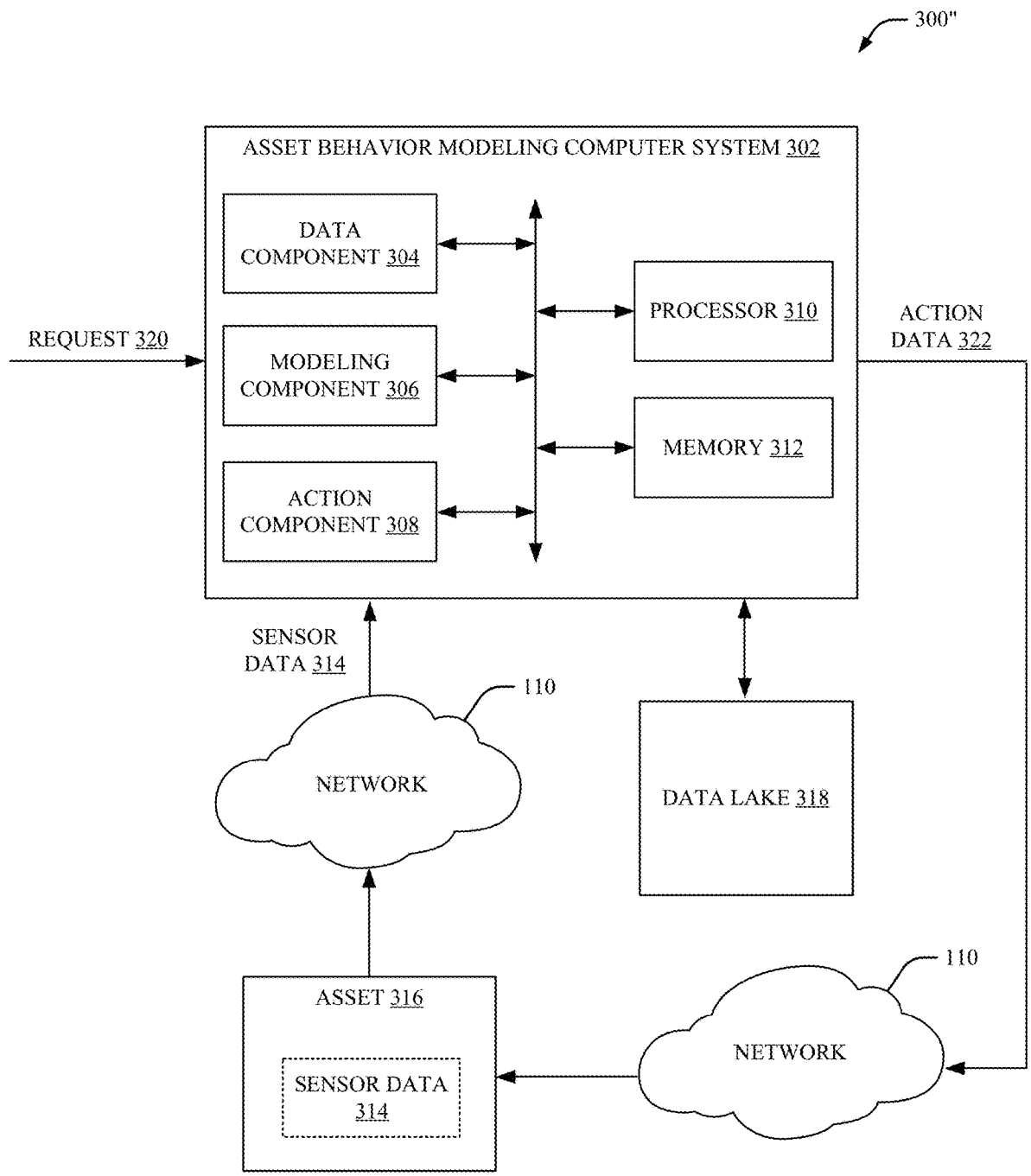
FIG. 6 illustrates yet another system that provides an exemplary environment, in accordance with one or more embodiments described herein.

FIG. 6 illustrates a system 300" that provides an exemplary environment according to one or more described features of one or more embodiments of the disclosure. In an embodiment, the system 300" corresponds to an alternate embodiment of the system 300 shown in FIG. 3. According to an embodiment, the system 300" includes the asset behavior modeling computer system 302, the asset 316, and/or the data lake 318. In one or more embodiments, the asset behavior modeling computer system 302 is in communication with the asset 316 via the network 110.

In one or more embodiments, an action associated with the action data 322 includes modifying one or more settings for the asset 316 based on the one or more insights. For instance, in one or more embodiments, the action data 322 is provided to the asset 316 to modify one or more settings for the asset 316. In an embodiment, the action component 308 determines an optimal setting for the asset 316 based on the one or more asset insights. Furthermore, certain embodiments, the action component 308 comparing the optimal setting to a regulation setting for the asset 316. The regulation setting is, for example, a minimal setting (e.g., a minimum fan speed setting) based on environmental regulations for the asset 316. In certain embodiments, the regulation setting is a minimal setting based on air quality criteria (e.g., one or more air quality constraints) for the asset 316. Additionally, in certain embodiments, the asset 316 is configured with the optimal setting via the action data 322 in response to a determination that the optimal setting is above the regulation setting. In certain embodiments, the action component 308 alternatively compares the optimal setting to a predefined list of settings for the asset 316. The predefined list of settings includes, for example, one or more previously employed settings for the asset 316 and/or one or more predetermined settings for the asset 316. Furthermore, in certain embodiments, the asset 316 is configured with the optimal setting via the action data 322 in response to a determination that the optimal setting matches a setting from the predefined list of settings.

Figure 7:
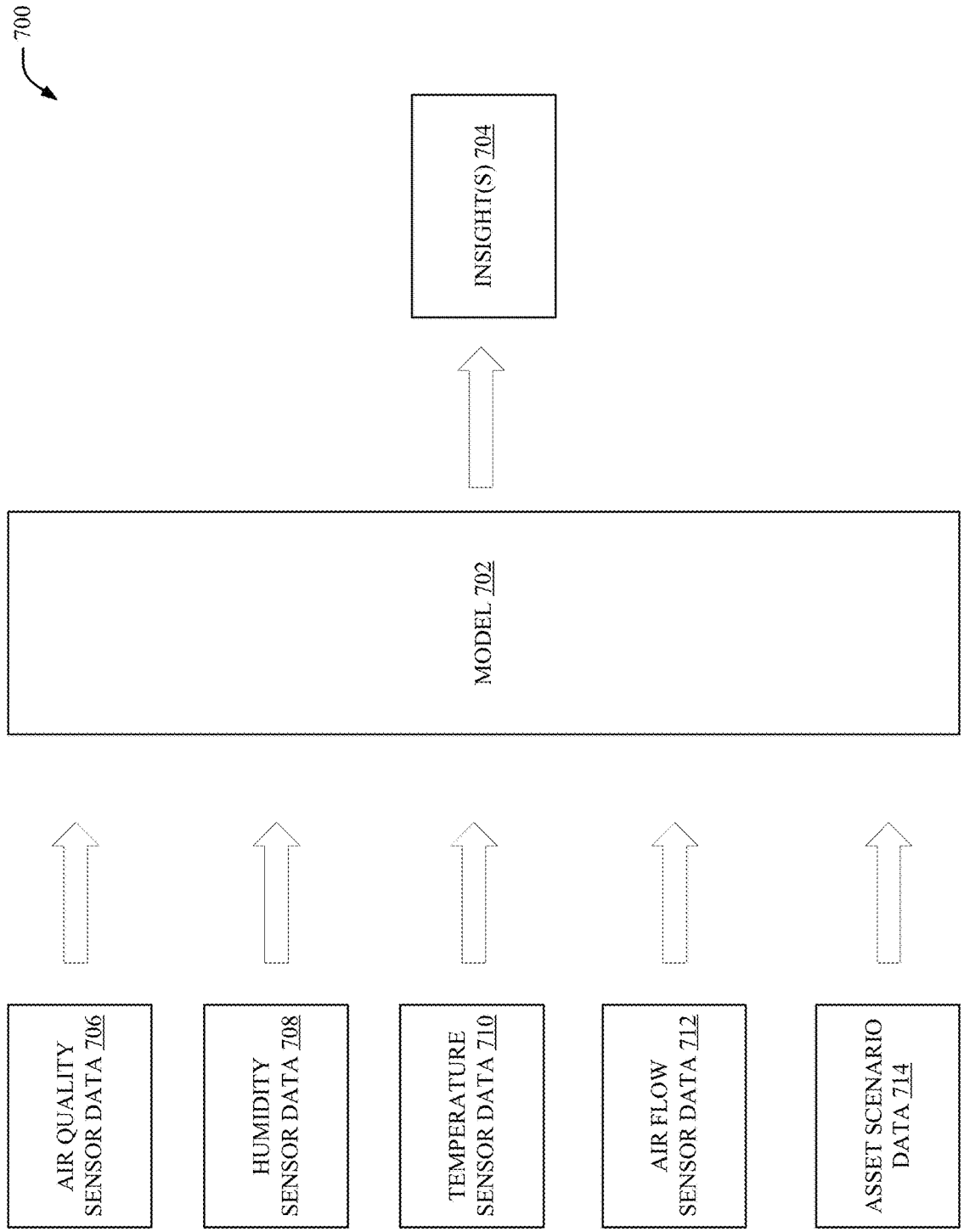
FIG. 7 illustrates a system for facilitating asset behavior modeling based on sensor data and asset scenario data, in accordance with one or more embodiments described herein.

FIG. 7 illustrates a system 700 according to one or more described features of one or more embodiments of the disclosure. In an embodiment, the system 700 includes a model 702. The model 702 is, for example, a model executed by the modeling component 306 to provide one or more insights 704. In an aspect, the model 702 represents predicted asset behavior of the asset 316. The one or more insights 704 include one or more asset insights, one or more cost saving insights, one or more predictive maintenance insights, and/or one or more other types of insights related to the asset 316. In one or more embodiments, the action data 322 is generated based on the one or more insights 704. According to various embodiments, the model 702 provides the one or more insights 704 based on air quality sensor data 706 generated by one or more air quality sensors associated with the asset 316 (e.g., one or more carbon dioxide sensors associated with the asset 316), humidity sensor data 708 generated by one or more humidity sensors associated with the asset 316, temperature sensor data 710 generated by one or more temperature sensors associated with the asset 316, air flow sensor data 712 generated by one or more air flow sensors associated with the asset 316, and/or asset scenario data 714 associated with different operation scenarios for the asset 316. The air quality sensor data 706, the humidity sensor data 708, the temperature sensor data 710, and/or the air flow sensor data 712 is, for example, sensor data included in the sensor data 314. In one or more embodiments, the model 702 is configured for curve fitting modeling and/or regression analysis modeling with respect to the air quality sensor data 706, the humidity sensor data 708, the temperature sensor data 710, the air flow sensor data 712, and/or the asset scenario data 714.

Figure 8:
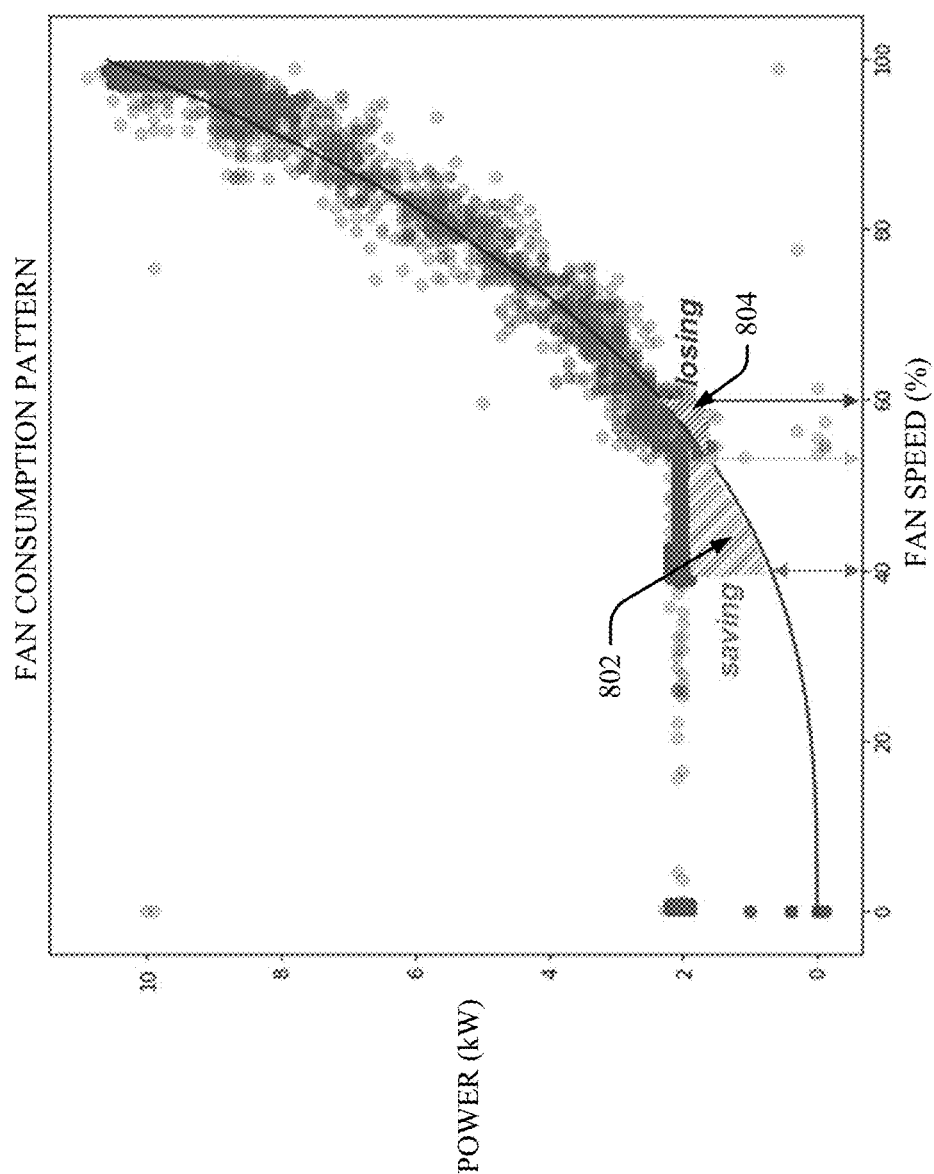
FIG. 8 illustrates an exemplary graph associated with a fan consumption pattern, in accordance with one or more embodiments described herein.

FIG. 8 illustrates a graph 800 associated with a fan consumption pattern related to an asset. For instance, in an embodiment, the graph 800 represents a fan consumption pattern for a fan of the asset 316 (e.g., a fan of an air handler unit). Certain air handler units have a minimal fan speed setting to ensure a desired level of ventilation. Therefore, below a certain level related to a fan speed command, the fan does not reduce speed. Based on collected fan data (e.g., the sensor data 314), in certain embodiments, the asset behavior modeling computer system 302 evaluates expected savings of lowering the minimal fan speed command and/or turning off the minimal fan speed command. Additionally, in certain embodiments based on collected fan data (e.g., the sensor data 314), the asset behavior modeling computer system 302 evaluates impact of increasing the minimal fan speed (e.g., to determine how much power consumption increases). In one or more embodiments, the asset behavior modeling computer system 302 models fan behavior based on fan speed (e.g., observed fan speed commands) associated with the sensor data 314 and power demand (kW) for the fan. Based on the modeling, the asset behavior modeling computer system 302 provides an optimal setting for the fan. For instance, an optimal setting for the fan is associated with a portion 802 of the graph 800 and a non-optimal setting for the fan is associated with a portion 804 of the graph 800.

Figure 9:
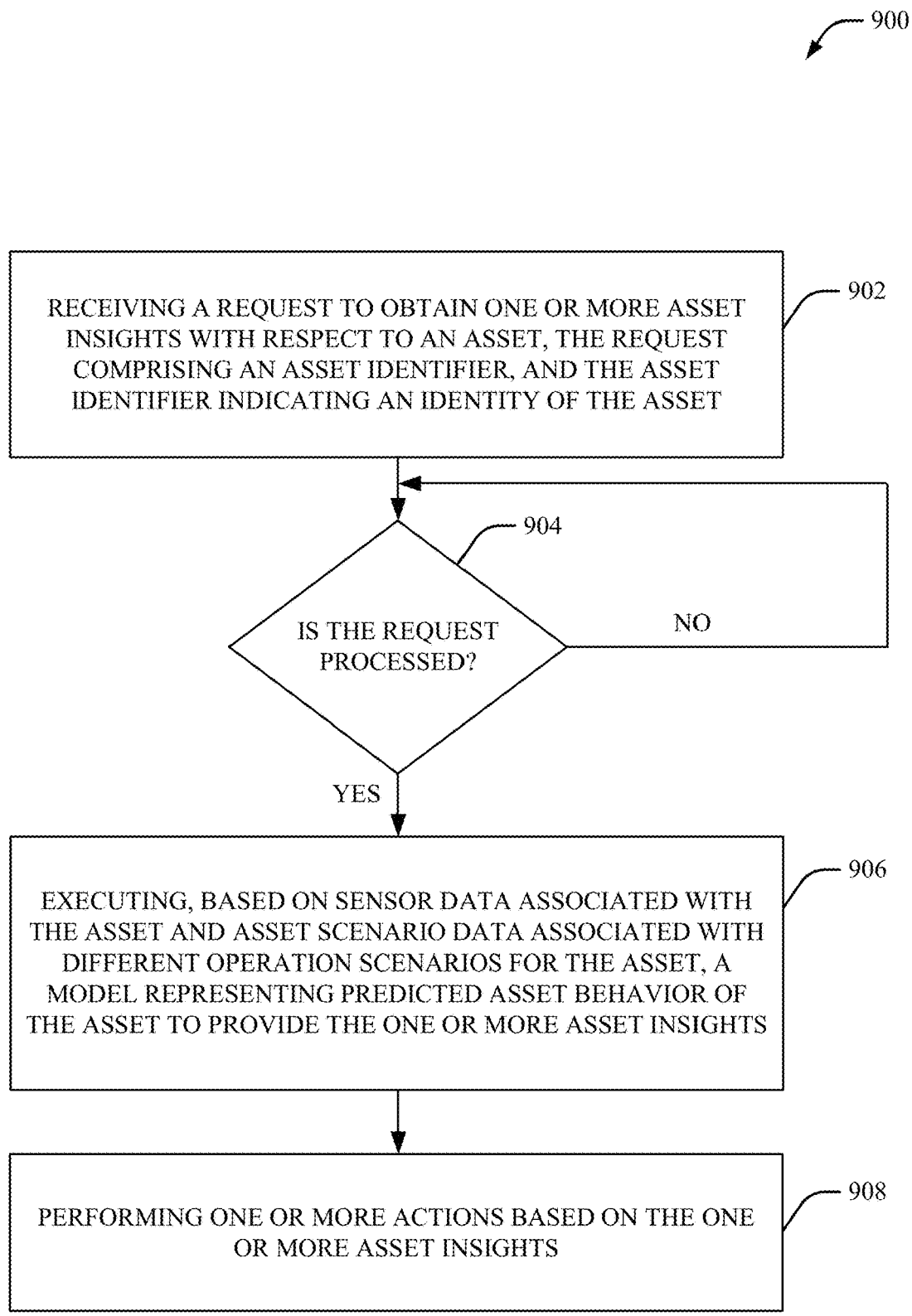
FIG. 9 illustrates a flow diagram for providing asset behavior modeling, in accordance with one or more embodiments described herein.

FIG. 9 illustrates a method 900 for providing asset behavior modeling, in accordance with one or more embodiments described herein. The method 900 is associated with the asset behavior modeling computer system 302, for example. For instance, in one or more embodiments, the method 900 is executed at a device (e.g., the asset behavior modeling computer system 302) with one or more processors and a memory. In one or more embodiments, the method 900 begins at block 902 that receives (e.g., by the modeling component 306) a request to obtain one or more asset insights with respect to an asset, the request comprising an asset identifier, and the asset identifier indicating an identity of the asset. The request to obtain the one or more asset insights provides one or more technical improvements such as, but not limited to, facilitating interaction with a computing device, extended functionality for a computing device and/or improving accuracy of data provided to a computing device.

At block 904, it is determined whether the request is processed. If no, block 904 is repeated to determine whether the request is processed. If yes, the method 900 proceeds to block 906. In response to the request, block 906 executes (e.g., by the modeling component 306), based on sensor data associated with the asset and asset scenario data associated with different operation scenarios for the asset, a model representing predicted asset behavior of the asset to provide the one or more asset insights. The executing the model provides one or more technical improvements such as, but not limited to, extended functionality for a computing device and/or improving accuracy of data provided to a computing device. In one or more embodiments, the executing the model includes executing the model based on a curve fitting modeling technique with respect to the sensor data and the asset scenario data. Additionally or alternatively, in one or more embodiments, the executing the model includes executing the model based on a regression analysis modeling technique with respect to the sensor data and the asset scenario data.

The method 900 also includes a block 908 that, in response to the request, performs (e.g., by the action component 308) one or more actions based on the one or more asset insights. The performing the one or more actions provides one or more technical improvements such as, but not limited to, providing a varied experience for a computing device. In one or more embodiments, the performing the one or more actions includes configuring a visualization of the one or more asset insights for display via an electronic interface of a computing device. In one or more embodiments, the performing the one or more actions includes generating, based on the one or more asset insights, one or more notifications for display via an electronic interface of a computing device. In one or more embodiments, the performing the one or more actions includes modifying one or more settings for the asset based on control data for the asset provided via an electronic interface of a computing device. In one or more embodiments, the performing the one or more actions includes generating one or more work orders for the asset based on work order data for the asset provided via an electronic interface of a computing device. In one or more embodiments, the performing the one or more actions includes retraining one or more portions of the model based on the one or more insights. In one or more embodiments, the performing the one or more actions includes determining an optimal setting for the asset based on the one or more asset insights, comparing the optimal setting to a regulation setting for the asset, and configuring the asset with the optimal setting in response to a determination that the optimal setting is above the regulation setting. In one or more embodiments, the performing the one or more actions includes determining an optimal setting for the asset based on the one or more asset insights, comparing the optimal setting to a predefined list of settings for the asset, and/or configuring the asset with the optimal setting in response to a determination that the optimal setting matches a setting from the predefined list of settings.

In one or more embodiments, the method 900 additionally includes collecting the sensor data from one or more sensors coupled to the asset. In one or more embodiments, the method 900 additionally or alternatively includes collecting the sensor data from one or more sensors included in a building environment associated with the asset. In one or more embodiments, the method 900 additionally or alternatively includes collecting at least a portion of the sensor data from an air quality sensor associated with the asset. In one or more embodiments, the method 900 additionally or alternatively includes collecting at least a portion of the sensor data from a humidity sensor associated with the asset.

In one or more embodiments, the method 900 additionally or alternatively includes collecting at least a portion of the sensor data from a temperature associated with the asset. In one or more embodiments, the method 900 additionally or alternatively includes collecting at least a portion of the sensor data from an air flow sensor associated with the asset. The collecting the sensor data provides one or more technical improvements such as, but not limited to, extending functionality of the model and/or improving accuracy of the model.

In one or more embodiments, the method 900 further includes aggregating the sensor data from different sensors. The aggregating the sensor data provides one or more technical improvements such as, but not limited to, extended functionality for a computing device and/or improving accuracy of data provided to a computing device. In one or more embodiments, the aggregating the disparate data includes storing the sensor data in a single data lake and/or updating data of the single data lake at one or more predetermined intervals based on new sensor data.

In one or more embodiments, the method 900 further includes performing a deep learning process with respect to the sensor data and the asset scenario data to provide the one or more insights associated with the disparate data. In one or more embodiments, the performing the deep learning process includes determining one or more classifications with respect to the sensor data and the asset scenario data to provide the one or more insights. The performing the deep learning process provides one or more technical improvements such as, but not limited to, extended functionality for a computing device and/or improving accuracy of data provided to a computing device. In one or more embodiments, the method 900 further includes employing a scoring model based on different metrics from historical iterations of the model and/or historical process operations associated with the asset to determine the one or more actions. The employing the scoring model provides one or more technical improvements such as, but not limited to, extended functionality for a computing device and/or improving accuracy of data provided to a computing device.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A system, comprising:
   one or more processors;
   a memory; and
   one or more programs stored in the memory, the one or more programs which, when executed by the processor, cause the processor to:
      receive a request to obtain one or more asset insights with respect to an asset, the request comprising:
         an asset identifier, the asset identifier indicating an identity of the asset; and in response to the request:
            execute, based on sensor data associated with the asset and asset scenario data associated with different operation scenarios for the asset, a model representing predicted asset behavior of the asset to provide the one or more asset insights, wherein the different operation scenarios for the asset include a plurality of settings for the asset and a plurality of time schedules for the asset; and
         perform one or more actions based on the one or more asset insights.

2. The system of claim 1, the one or more programs which, when executed by the processor, further cause the processor to:
   collect the sensor data from one or more sensors coupled to the asset.

3. The system of claim 1, the one or more programs which, when executed by the processor, further cause the processor to:
   collect the sensor data from one or more sensors included in a building environment associated with the asset.

4. The system of claim 1, the one or more programs which, when executed by the processor, further cause the processor to:
   execute the model based on a curve fitting modeling technique with respect to the sensor data and the asset scenario data.

5. The system of claim 1, the one or more programs which, when executed by the processor, further cause the processor to:
   execute the model based on a regression analysis modeling technique with respect to the sensor data and the asset scenario data.

6. The system of claim 1, the one or more programs which, when executed by the processor, further cause the processor to:
   configure a visualization of the one or more asset insights for display via an electronic interface of a computing device.

7. The system of claim 1, the one or more programs which, when executed by the processor, further cause the processor to:
   generate, based on the one or more asset insights, one or more notifications for display via an electronic interface of a computing device.

8. The system of claim 1, the one or more programs which, when executed by the processor, further cause the processor to:
   modify one or more settings of the plurality of settings for the asset based on control data for the asset provided via an electronic interface of a computing device.

9. The system of claim 1, the one or more programs which, when executed by the processor, further cause the processor to:
   determine an optimal setting for the asset based on the one or more asset insights;
   compare the optimal setting to a regulation setting for the asset; and
   configure the asset with the optimal setting in response to a determination that the optimal setting is above the regulation setting.

10. The system of claim 1, the one or more programs which, when executed by the processor, further cause the processor to:
    determine an optimal setting for the asset based on the one or more asset insights;
    compare the optimal setting to a predefined list of settings for the asset; and
    configure the asset with the optimal setting in response to a determination that the optimal setting matches a setting from the predefined list of settings.

11. The system of claim 1, wherein the asset scenario data includes a power consumption estimation for the asset, wherein the power consumption estimation provides estimated power consumption for the asset based on the plurality of settings for the asset and the plurality of time schedules for the asset.

12. The system of claim 1, wherein the one or more asset insights include an optimal fan speed setting for the asset.

13. A method, comprising:
    at a device with one or more processors and a memory:
       receiving a request to obtain one or more asset insights with respect to an asset, wherein the request comprises:
          an asset identifier, the asset identifier indicating an identity of the asset; and in response to the request:
             executing, based on sensor data associated with the asset and asset scenario data associated with different operation scenarios for the asset, a model representing predicted asset behavior of the asset to provide the one or more asset insights, wherein the different operation scenarios for the asset include a plurality of settings for the asset and a plurality of time schedules for the asset; and performing one or more actions based on the one or more asset insights.

14. The method of claim 13, further comprising:
collecting the sensor data from one or more sensors coupled to the asset.

15. The method of claim 13, further comprising:
collecting the sensor data from one or more sensors included in a building environment associated with the asset.

16. The method of claim 13, the executing comprising executing the model based on a curve fitting modeling technique with respect to the sensor data and the asset scenario data.

17. The method of claim 13, the executing comprising executing the model based on a regression analysis modeling technique with respect to the sensor data and the asset scenario data.

18. The method of claim 13, the performing the one or more actions comprising configuring a visualization of the one or more asset insights for display via an electronic interface of a computing device.

19. The method of claim 13, the performing the one or more actions comprising modifying one or more settings of the plurality of settings for the asset based on control data for the asset provided via an electronic interface of a computing device.

20. The method of claim 13, the performing the one or more actions comprising:
determining an optimal setting for the asset based on the one or more asset insights;
comparing the optimal setting to a regulation setting for the asset; and
configuring the asset with the optimal setting in response to a determination that the optimal setting is above the regulation setting.

21. The method of claim 13, the performing the one or more actions comprising:
determining an optimal setting for the asset based on the one or more asset insights;
comparing the optimal setting to a predefined list of settings for the asset; and
configuring the asset with the optimal setting in response to a determination that the optimal setting matches a setting from the predefined list of settings.

22. A non-transitory computer-readable storage medium comprising one or more programs for execution by one or more processors of a device, the one or more programs including instructions which, when executed by the one or more processors, cause the device to:
receive a request to obtain one or more asset insights with respect to an asset, the request comprising:
an asset identifier, the asset identifier indicating an identity of the asset; and in response to the request:
execute, based on sensor data associated with the asset and asset scenario data associated with different operation scenarios for the asset, a model representing predicted asset behavior of the asset to provide the one or more asset insights, wherein the different operation scenarios for the asset include a plurality of settings for the asset and a plurality of time schedules for the asset; and
perform one or more actions based on the one or more asset insights.

\* \* \* \* \*